(12) United States Patent
Wells et al.

(10) Patent No.: US 8,963,046 B2
(45) Date of Patent: Feb. 24, 2015

(54) SELF-ADJUSTING LINER ASSEMBLY FOR WELDING TORCH

(75) Inventors: Jeffrey G. Wells, Belle River (CA); Kenneth K. Pratt, Tecumseh (CA)

(73) Assignee: Illinois Tool Works Inc., Glenview, IL (US)

( * ) Notice: Subject to any disclaimer, the term of this patent is extended or adjusted under 35 U.S.C. 154(b) by 907 days.

(21) Appl. No.: 13/153,486

(22) Filed: Jun. 6, 2011

(65) Prior Publication Data

US 2011/0233179 A1    Sep. 29, 2011

Related U.S. Application Data

(63) Continuation-in-part of application No. 11/715,715, filed on Mar. 8, 2007, now Pat. No. 8,373,094.

(51) Int. Cl.
*B23K 9/28* (2006.01)
*B23K 9/32* (2006.01)

(52) U.S. Cl.
CPC ........................................ *B23K 9/32* (2013.01)
USPC .................................................. 219/137.52

(58) Field of Classification Search
CPC ....... B23K 9/122; B23K 9/32; B23K 2201/32
USPC ......... 219/125.1, 137.44, 137.51, 137.7, 138, 219/143; 901/42
See application file for complete search history.

(56) References Cited

U.S. PATENT DOCUMENTS

| | | | |
|---|---|---|---|
| 2,270,767 A | 1/1942 | Platz | |
| 2,863,983 A | 12/1958 | Kane et al. | |
| 2,870,324 A | 1/1959 | Albert | |
| 3,119,948 A | 1/1964 | Baird | |
| 3,174,025 A | 3/1965 | Johnson | |
| 3,321,607 A * | 5/1967 | Falcone et al. | 219/98 |
| 3,445,619 A | 5/1969 | Kelemen | |
| 3,529,128 A * | 9/1970 | Cruz, Jr. | 219/137.44 |
| 3,783,233 A * | 1/1974 | dal Molin | 219/137.61 |

(Continued)

FOREIGN PATENT DOCUMENTS

| | | |
|---|---|---|
| EP | 2070629 | 6/2009 |
| JP | 56-115799 | 8/1981 |

(Continued)

OTHER PUBLICATIONS

International Search Report and Written Opinion dated Sep. 17, 2012 in PCT/US2012/040883.

(Continued)

*Primary Examiner* — Thien S Tran
(74) *Attorney, Agent, or Firm* — Fildes & Outland, P.C.

(57) ABSTRACT

A self-adjusting liner assembly for a welding torch includes an elongated tubular body having a forward end, a rearward end, and a central bore extending from the forward end to the rearward end. An elongated fixed tube is mounted in the bore. The assembly further includes an elongated tubular slide having an inner end, an outer end, and a shoulder proximate the outer end. The fixed tube is received in the inner end of the slide, and the slide cooperates with the fixed tube in a telescoping relationship in the bore. A resilient member is disposed in the bore and envelopes a portion of the fixed tube and the slide. The resilient member engages the shoulder of the slide and urges the slide away from the fixed tube and toward the forward end of the body.

11 Claims, 6 Drawing Sheets

(56) References Cited

U.S. PATENT DOCUMENTS

| | | | |
|---|---|---|---|
| 3,909,585 A * | 9/1975 | Sanders et al. | 219/137.51 |
| 4,365,137 A * | 12/1982 | Tarasov et al. | 219/137.31 |
| 4,591,690 A | 5/1986 | Reijmersdal | |
| 6,028,283 A | 2/2000 | Brunken, Sr. | |
| 6,297,472 B1 | 10/2001 | Bong et al. | |
| 2003/0062353 A1 | 4/2003 | Niemann et al. | |
| 2008/0217314 A1 | 9/2008 | Wells et al. | |

FOREIGN PATENT DOCUMENTS

| | | |
|---|---|---|
| JP | 58-023278 | 2/1983 |
| JP | 59013574 | 1/1984 |
| JP | 2004-167583 | 6/2004 |
| JP | 2007-007675 | 1/2007 |
| WO | 80/01722 | 9/1980 |
| WO | 2005/021199 | 3/2005 |

OTHER PUBLICATIONS

Japanese Office Action in 2011-518790 dated Jun. 11, 2013.

English Abstract in JP 56-115799 and 58-023278.

English Abstract in JP 2007-007675.

English Abstract in JP 2004-167583.

* cited by examiner

SELF-ADJUSTING LINER ASSEMBLY FOR WELDING TORCH

CROSS REFERENCE TO RELATED APPLICATION

This application is a continuation-in-part of U.S. patent application Ser. No. 11/715,715, filed Mar. 8, 2007.

TECHNICAL FIELD

This invention relates to liners for welding torches, and more particularly to a self-adjusting liner assembly for a welding torch.

BACKGROUND OF THE INVENTION

It is known in the art that a conventional welding torch includes a liner retainer installed into a distal end of the welding torch. A liner insert is inserted into a proximal end of the welding torch and secured to the liner retainer. Once the liner insert is secured to the liner retainer, the liner insert is cut to a predetermined size (e.g., about 0.1 centimeters to about 10 centimeters past the end of the welding torch) and electrode wire can be fed through an aperture in the liner retainer.

In such torches the liner may become unseated from the retainer due, for example, to expansion of the welding torch. Unseating of the liner may cause improper feeding of the electrode wire into a contact tip of the welding torch. This may also cause increased wear of the contact tip, leading to premature replacement of the contact tip.

SUMMARY OF THE INVENTION

The present invention provides a self-adjusting liner assembly that maintains proper liner position in a welding torch. The liner assembly utilizes a spring loaded mechanism that constantly pushes the liner forward into a retaining head, into which a contact tip is threaded. This ensures proper feeding of electrode wire into the contact tip and reduces contact tip wear where the wire enters the tip. The liner assembly also allows for passage of welding gas through the assembly.

More particularly, a self-adjusting liner assembly for a welding torch in accordance with the invention includes an elongated tubular body having a forward end, a rearward end, and a central bore extending from the forward end to the rearward end. An elongated fixed tube is mounted in the bore. The assembly further includes an elongated tubular slide having an inner end, an outer end, and a shoulder proximate the outer end. The fixed tube is received in the inner end of the slide, and the slide cooperates with the fixed tube in a telescoping relationship in the bore. A resilient member is disposed in the bore and envelopes a portion of the fixed tube and the slide. The resilient member engages the shoulder of the slide and urges the slide away from the fixed tube and toward the forward end of the body.

The body may be defined at least in part by a power pin. The resilient member may be a spring or similar. The assembly may further include an inlet guide disposed in the rearward end of the body, and the inlet guide includes a recess in which the fixed tube is received. The shoulder of the slide is urged toward the forward end of the body. The slide may include a retainer at the outer end for receiving a front loading liner. The front loading liner may include a liner insert and a liner body connected to the liner insert. The liner insert is receivable in the retainer of the slide. The slide may include at least one longitudinally extending gas passage. The gas passage may be defined as one of a longitudinally extending recess disposed on the periphery of the shoulder and a longitudinally extending aperture through the shoulder.

In another embodiment, a self-adjusting liner assembly for a welding torch in accordance with the invention includes an elongated tubular power pin having a forward end, a rearward end, and a central bore extending from the forward end to the rearward end. The bore includes a stop in the forward end and a seat in the rearward end. An inlet guide including a recess is disposed in the rearward end of the body adjacent the seat. An elongated fixed tube is received in the recess of the inlet guide and extends into the bore. The assembly further includes an elongated tubular slide having an inner end, an outer end, a shoulder proximate the outer end, and at least one longitudinally extending gas passage defined by a recess disposed on the periphery of the shoulder. An end of the fixed tube opposite the inlet guide is received in the inner end of the slide, and the slide cooperates with the fixed tube in a telescoping relationship in the bore. A spring is disposed in the bore and envelopes a portion of the fixed tube and the slide. The spring engages the shoulder of the slide on one end and the inlet guide on an opposite end, and urges the slide away from the fixed tube and toward the forward end of the body.

A welding torch in accordance with the invention includes an elongated tubular power pin having a forward end, a rearward end, and a central bore extending from the forward end to the rearward end. The bore includes a stop in the forward end and a seat in the rearward end. A self-adjusting liner assembly is housed in the bore of the power pin and includes an inlet guide including a recess. The inlet guide is disposed in the rearward end of the power pin adjacent the seat. An elongated fixed tube is received in the recess of the inlet guide and extends into the bore. The assembly further includes an elongated tubular slide having an inner end, an outer end, a shoulder proximate the outer end. An end of the fixed tube opposite the inlet guide is received in the inner end of the slide, and the slide cooperates with the fixed tube in a telescoping relationship in the bore. A resilient member is disposed in the bore and envelopes a portion of the fixed tube and the slide. The resilient member engages the shoulder of the slide on one end and the inlet guide on another end, and urges the slide away from the fixed tube and toward the forward end of the body. The welding torch also includes a front handle and a gooseneck having first and second ends. The forward end of the power pin is removably mounted in the rear handle. The first end of the gooseneck is operatively connected to the front handle. A contact tip assembly is mounted on the second end of the gooseneck.

In a specific embodiment of the welding torch, the welding torch may include a front loading liner that is inserted from the second end of the gooseneck to the power pin mounted in the rear handle. The slide may include a retainer at the outer end for receiving the front loading liner. The front loading liner may include a liner insert and a liner body connected to the liner insert. The liner insert is receivable in the retainer of the slide. The slide may also include at least one longitudinally extending gas passage therethrough.

These and other features and advantages of the invention will be more fully understood from the following detailed description of the invention taken together with the accompanying drawings.

DETAILED DESCRIPTION OF THE INVENTION

Figure 1:
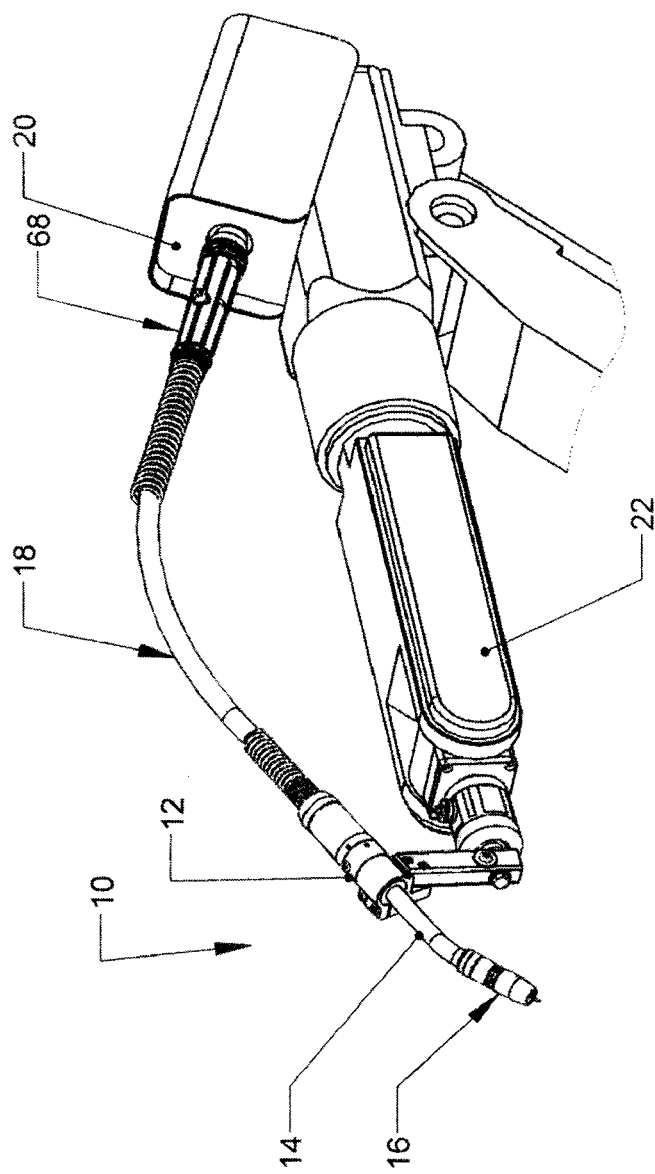
FIG. 1 is an environmental perspective view of a welding torch including a self-adjusting liner assembly mounted on a robotic arm.
Figure 2:
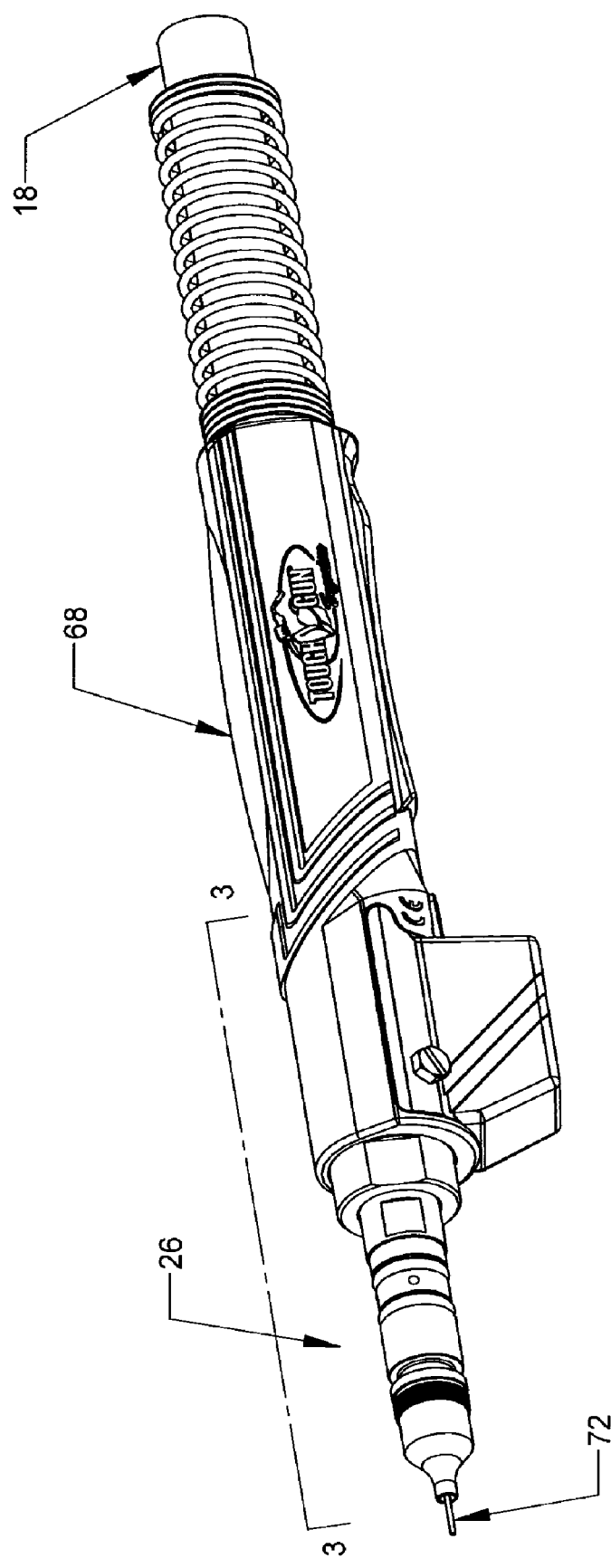
FIG. 2 is a perspective view of a power pin including the self-adjusting liner assembly and an associated welding torch body.
Figure 3:
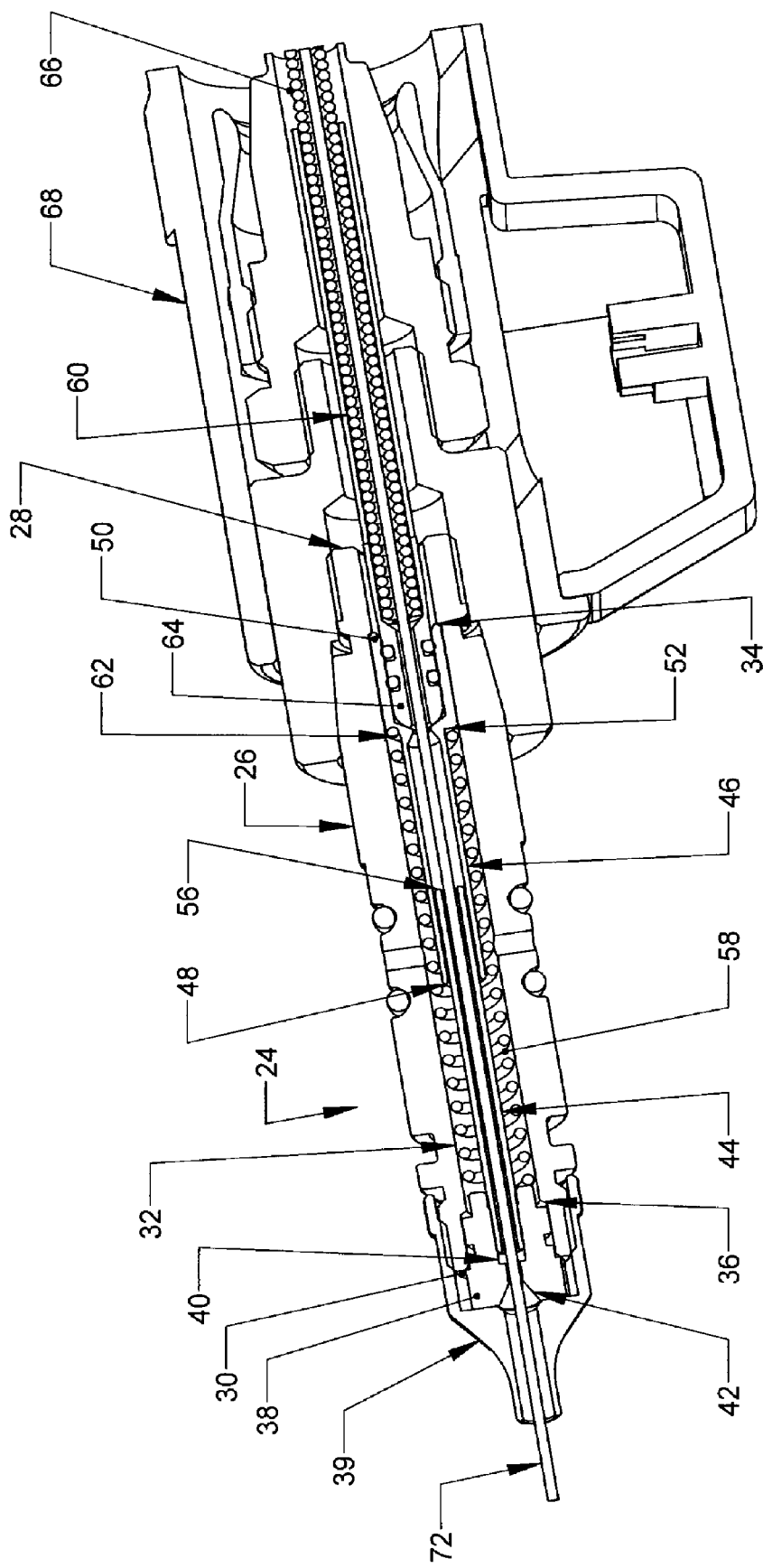
FIG. 3 is a cross-sectional view of the power pin including the self-adjusting liner assembly and the welding torch body taken along the line 3-3 in FIG. 2.
Figure 4:
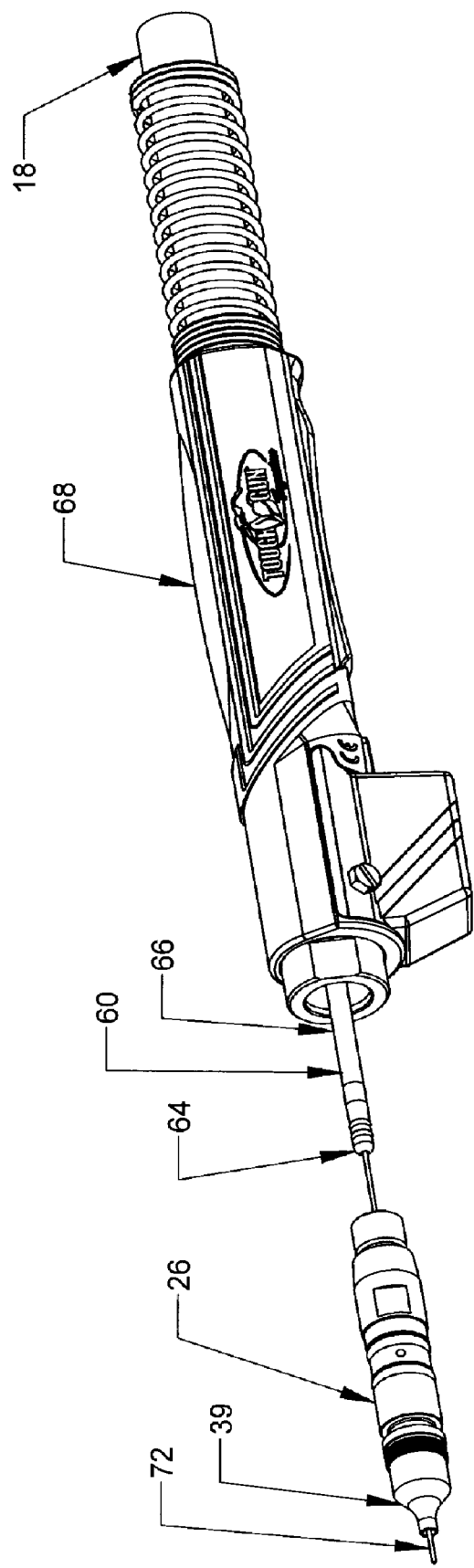
FIG. 4 is an exploded perspective view of a portion of the welding torch including the self-adjusting liner assembly.
Figure 5:
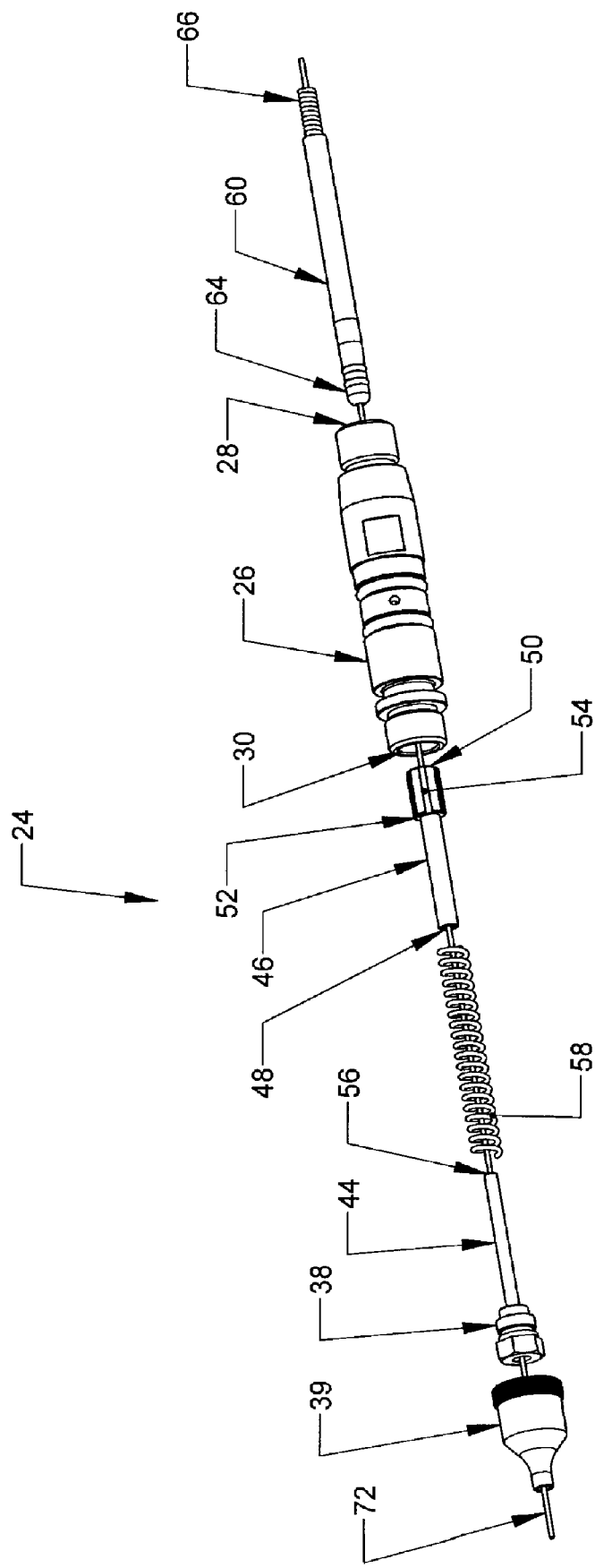
FIG. 5 is an exploded perspective view of the power pin and self-adjusting liner assembly.
Figure 6:
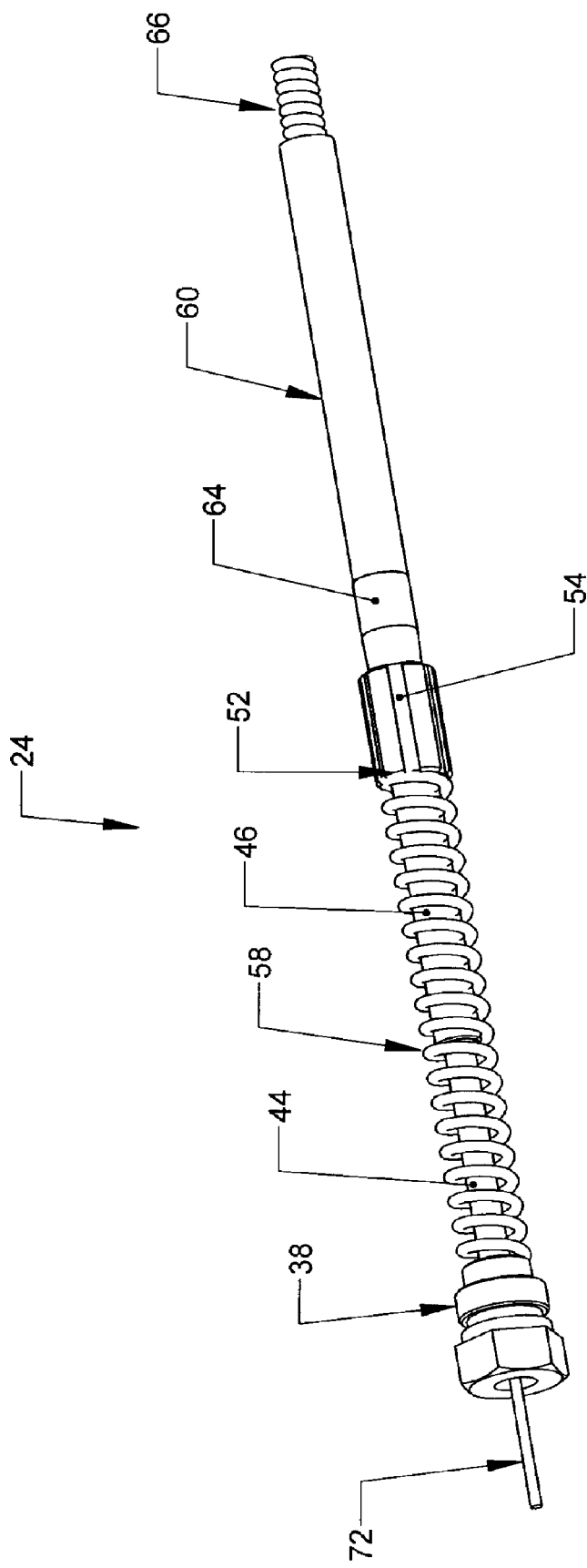
FIG. 6 is a perspective view of the self-adjusting liner assembly and an associated front load liner.

Referring now to the FIG. 1 in detail, numeral 10 generally indicates a welding torch such as a gas metal arc welding (GMAW) torch, a metal inert gas (MIG) torch, or similar welding torch. The welding torch 10 broadly includes a main housing 12, a gooseneck 14, and a contact tip assembly 16. A cable 18 is connected to a rearward end of the main housing 12 to supply gas, electrical current, and a consumable electrode (e.g., a metal welding wire) to the torch 10. The cable 18 may be connected via a rear handle 68 to a wire feeder 20 opposite the main housing 12. The gooseneck 14 is operatively connected to a forward end of the main housing 12 and allows for the communication of the consumable electrode, the shielding gas, and the welding current to the contact tip assembly 16 mounted on the gooseneck. The welding torch 10 also may be mounted to a robotic arm 22.

The wire feeder 20 feeds the welding wire through the welding torch 10, and ultimately through an orifice in the contact tip assembly 16 at the forward end of the welding torch. The welding wire, when energized for welding, carries a high electrical potential. When the welding wire makes contact with target metal workpieces, an electrical circuit is completed and current flows through the welding wire, across the metal workpieces and to ground. The current causes the welding wire and the parent metal of the workpieces in contact with the welding wire to melt, thereby joining the workpieces as the melt solidifies.

With reference to FIGS. 2 through 6, the welding torch 10 includes a self-adjusting liner assembly 24 in accordance with the invention. The self-adjusting liner assembly 24 includes an elongated tubular body 26 which may be defined at least in part by a power pin or may be a tubular member that is separate from and connected to the power pin. In the embodiment shown in the drawings, the tubular body is entirely defined by the power pin. The tubular body has a forward end 28, a rearward end 30, and a central bore or through hole 32 extending from the forward end to the rearward end. The bore 32 includes a stop 34 in the forward end 28 for limiting the movement of a slide and a seat 36 in the rearward end 30 for seating an inlet guide.

An inlet guide 38 is disposed in the rearward end 30 of the body 26 and removably mounted therein the bore 32 adjacent the seat 36 such that the inlet guide engages the seat. A cap 39 may be attached to the rearward end 30 of the body 26 and may cover over the inlet guide 38. The inlet guide 38 includes a recess 40 which is defined by an increased diameter portion of a passage 42 through the inlet guide. An elongated fixed tube 44 is received in the recess 40 of the inlet guide 38 and thereby mounted in the bore 32 of the body 26 such that the fixed tube extends inwardly into the bore.

The liner assembly 24 further includes an elongated tubular slide 46 having an inner end 48, an outer end 50, a shoulder 52 proximate the outer end, and at least one longitudinally extending gas passage 54 defined by one of a longitudinally extending recess disposed on the periphery of the shoulder and a longitudinally extending aperture through the shoulder. In a specific embodiment, the slide 46 includes a plurality of gas passages 54. The gas passage(s) 54 allow for the passage of shielding gas through the slide 46. The slide shoulder 52 is generally disposed toward the forward end 28 of the body 26. The slide 46 cooperates with the fixed tube 44 in a telescoping relationship in the bore 32 of the body 26. In other words, an end 56 of the fixed tube opposite the inlet guide 38 is received in the inner end 48 of the slide 46, and the slide 46 is slidable about the fixed tube 44, varying the distance between the shoulder 52 and the inlet guide 38.

A resilient member 58 such as a spring, coil spring, or other resilient, compressible member is disposed in the bore 32 of the body 26. The resilient member 58 envelops a portion of the fixed tube 44 and the slide 46 between the slide shoulder 52 and inlet guide 38. One end of the resilient member 58 engages the slide shoulder 52 and an opposite end of the resilient member engages the inlet guide 38. The resilient member 58 urges the slide 46 away from the fixed tube 44, causing the slide to be urged toward the forward end 28 of the body 26. When the slide 46 is fully extended, it engages and is limited in motion by the stop 34.

The welding torch may also include a quick-load front loading liner 60. The front loading liner 60 provides a channel for the welding wire from the liner assembly 24 through the gooseneck 14 into the contact tip assembly 16. The slide 46 may include a retainer 62 in the shoulder 52 generally adjacent the forward end 28 of the body 26 at the outer end 50 of the slide. An end of the front loading liner 60 may be inserted into the bore 32 of the body 26 at the body forward end 28 and is receivable in the retainer 62. In a specific embodiment, the front loading liner 60 may include liner insert 64 defining the end of the liner and a flexible liner body 66 connected to or integral with the liner insert. The liner body 66 may be a metal (e.g., aluminum) coil. In this embodiment, the liner insert 64 is inserted into the retainer 62 and releasably secured therein.

Referring now to FIGS. 1 through 6, the self-adjusting liner assembly 24 is positioned at the rearward end of the welding torch 10. The forward end of the power pin including the liner assembly 24 is connected to the rear handle 68, and the rear handle 68 is operatively connected to the gooseneck 14 via the cable 18. Thus, the rear handle 68 is intermediate the body 26 of the liner assembly 24 and the gooseneck 14. The contact tip assembly 16 is connected to the forward end of the gooseneck 14 opposite the liner assembly 24 and rear handle 68. The front loading liner 60 is installed from the front of the welding torch 10. To install the liner 60, the contact tip assembly 16 (which may include a retaining head and contact tip) may be removed from the welding torch 10. The liner 60 is then inserted from the front of the welding torch 10 and fed into the welding torch. As the liner 60 is fed into the torch, the liner enters the bore 32 of the body 26 from the gooseneck 14 and rear handle 68, and is received in the piston recess 68, causing the liner 60 to become engaged with the retainer 62 in the slide 46. The liner 60 is further urged into the torch to compress the resilient member 58 via slide 46, and then the liner is cut approximately ⅝ of an inch from the forward end of the gooseneck 14. The contact tip assembly 16 may then be reinstalled on the welding torch 10 at the forward end of the gooseneck 14.

At this time, the slide 46 generally fully compresses the resilient member 58, and the counterforce of the resilient member 58 urges the slide forward. The force the resilient member exerts on the slide maintains engagement of the slide with the liner insert 64 of the front loading liner 60 and engagement of the liner body 66 in the contact tip assembly 16.

Welding wire 72 is fed through the welding torch 10 (for example, by wire feeder 20) from the rear of the torch to the forward end of the torch. As it is fed, the welding wire 72 passes through the guide cap 39 (if present) into the power pin, through the passage 42 in the inlet guide 38 into the fixed tube 44, through the fixed tube into the tubular slide 46, through the tubular slide into the front loading liner 60, and all the way through the front loading liner into the contact tip assembly 16. As the welding wire 72 passes through the liner assembly 24, the fixed tube 44 and tubular slide 46 support the welding wire and aid in preventing the wire from wandering or binding inside the liner assembly.

It is critical that the liner 60 is seated properly directly behind the contact tip of the contact tip assembly 16 at the front end of the torch 10 to reduce wear of the contact tip and to maintain proper feeding of the welding wire 72 into the contact tip. Advantageously, the self-adjusting liner assembly 24 constantly urges the liner 60 forward (via slide 46) into a mating seat in the contact tip assembly 16, ensuring that liner is properly positioned in the contact tip and that the welding wire 72 is properly fed into the contact tip. For example, as the welding torch 10 is operated, it expands over time due to the thermal expansion of the materials of torch body caused by the heat of the welding process. Also, if the liner 60 is made of plastic, gas and heat may cause the liner, especially the front portion in the contact tip assembly 16, to be consumed over time. Otherwise, if the liner 60 is made of metal or similar, the liner is not likely to be consumed. As the torch 10 expands and/or the liner 60 is consumed, the slide 46 advances forward in the bore 32 of the body 26, thereby continually urging the liner 60 forward such that the front end of the liner 60 is properly seated in the contact tip assembly 16. In one embodiment, the slide 46 may be able to travel about one inch in the bore 32 before contacting the stop 34. When the slide shoulder 52 becomes engaged with the stop 34, the slide 46 is in its fully extended position (e.g., see FIG. 3) and cannot move any farther forward. At this time, it may be necessary to replace the front loading liner 60 and recompress the resilient member 58.

Although the invention has been described by reference to specific embodiments, it should be understood that numerous changes may be made within the spirit and scope of the inventive concepts described. Accordingly, it is intended that the invention not be limited to the described embodiments, but that it have the full scope defined by the language of the following claims.

What is claimed is:
1. A self-adjusting liner assembly for a welding torch comprising:
an elongated tubular body having a forward end, a rearward end, and a central bore extending from said forward end to said rearward end, said elongated tubular body being defined at least in part by a power pin;
an elongated fixed tube mounted in said central bore;
an elongated tubular slide having an inner end, an outer end, and a shoulder proximate said outer end;
said elongated fixed tube being received in said inner end of said elongated tubular slide, and said elongated tubular slide cooperating with said elongated fixed tube in a telescoping relationship in said central bore;
a resilient member disposed in said central bore and enveloping a portion of said elongated fixed tube and said elongated tubular slide, said resilient member engaging said shoulder of said elongated tubular slide and urging said elongated tubular slide away from said elongated fixed tube and toward the forward end of said elongated tubular body; and
a front loading liner providing a channel for welding wire from said elongated tubular body, said elongated tubular slide including a retainer at said outer end that receives said front loading liner in said forward end of said elongated tubular body.

2. The self-adjusting liner assembly of claim 1, wherein said resilient member is a spring.

3. The self-adjusting liner assembly of claim 1, including an inlet guide disposed in said rearward end of said elongated tubular body, said inlet guide including a recess in which said elongated fixed tube is received.

4. The self-adjusting liner assembly of claim 1, wherein said shoulder of said elongated tubular slide is urged toward said forward end of said elongated tubular body.

5. The self-adjusting liner assembly of claim 1, wherein said front loading liner includes a liner insert and a liner body connected to said liner insert, said liner insert being receivable in said retainer of said elongated tubular slide.

6. The self-adjusting liner assembly of claim 1, wherein said elongated tubular slide includes at least one longitudinally extending gas passage, said longitudinally extending gas passage being defined as one of a longitudinally extending recess disposed on the periphery of said shoulder and a longitudinally extending aperture through said shoulder.

7. A self-adjusting liner assembly for a welding torch comprising:
an elongated tubular power pin having a forward end, a rearward end, and a central bore extending from said forward end to said rearward end, said central bore including a stop in said forward end and a seat in said rearward end;
an inlet guide including a recess, said inlet guide being disposed in said rearward end of said elongated tubular power pin adjacent said seat;
an elongated fixed tube received in said recess of said inlet guide and extending into said central bore;
an elongated tubular slide having an inner en& an outer end, a shoulder proximate said outer end, and at least one longitudinally extending gas passage defined by a recess disposed on the periphery of said shoulder;
an end of said elongated fixed tube opposite said inlet guide being received in said inner end of said elongated tubular slide, and said elongated tubular slide cooperating with said elongated fixed tube in a telescoping relationship in said central bore;
a spring disposed in said central bore and enveloping a portion of said elongated fixed tube and said elongated tubular slide, said spring engaging said shoulder of said elongated tubular slide on one end and said inlet guide on an opposite end, and urging said elongated tubular slide away from said elongated fixed tube and toward the forward end of said elongated tubular power pin; and
a front loading liner providing a channel for welding wire from said elongated tubular power pin, said elongated tubular slide including a retainer at said outer end that receives said front loading liner in said forward end of said elongated tubular power pin.

8. A welding torch comprising:

an elongated tubular power pin having a forward end, a rearward end, and a central bore extending from said forward end to said rearward end, said central bore including a stop in said forward end and a seat in said rearward end;

a self-adjusting liner assembly housed in the central bore of the elongated tubular power pin, the self-adjusting liner assembly including:

an inlet guide including a recess, said inlet guide being disposed in said rearward end of said elongated tubular power pin adjacent said seat;

an elongated fixed tube received in said recess of said inlet guide and extending into said central bore;

an elongated tubular slide having an inner end, an outer end, a shoulder proximate said outer end;

an end of said elongated fixed tube opposite said inlet guide being received in said inner end of said elongated tubular slide, and said elongated tubular slide cooperating with said elongated fixed tube in a telescoping relationship in said central bore; and a resilient member disposed in said central bore and enveloping a portion of said elongated fixed tube and said elongated tubular slide, said resilient member engaging said shoulder of said elongated tubular slide on one end and said inlet guide on another end, and urging said elongated tubular slide away from said elongated fixed tube and toward the forward end of said elongated tubular power pin;

a rear handle, said forward end of said elongated tubular power pin being removably mounted in said rear handle;

a gooseneck having first and second ends, said first end being operatively connected to said rear handle via a cable;

a contact tip assembly mounted on said second end of said gooseneck; and the self-adjusting liner assembly including a front loading liner that is inserted from said second end of said gooseneck to said elongated tubular power pin mounted in said rear handle, said front loading liner providing a channel for welding wire from said self-adjusting liner assembly in said elongated tubular power in through said gooseneck.

9. The welding torch of claim 8, wherein said elongated tubular slide includes a retainer at said outer end for receiving said front loading liner.

10. The self-adjusting liner assembly of claim 9, wherein said front loading liner includes a liner insert and a liner body connected to said liner insert, said liner insert being receivable in said retainer of said elongated tubular slide.

11. The welding torch of claim 8, wherein said elongated tubular slide includes at least one longitudinally extending gas passage therethrough.

* * * * *